(12) United States Patent
Craine et al.

(10) Patent No.: US 8,429,533 B2
(45) Date of Patent: Apr. 23, 2013

(54) SYSTEMS, METHODS, AND COMPUTER READABLE STORAGE MEDIA FOR PROVIDING VIRTUAL MEDIA ENVIRONMENTS

(75) Inventors: Ari Craine, Marietta, GA (US); Steven Tischer, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 978 days.

(21) Appl. No.: 11/860,831

(22) Filed: Sep. 25, 2007

(65) Prior Publication Data

US 2009/0083448 A1 Mar. 26, 2009

(51) Int. Cl.
*G06F 3/00* (2006.01)
*G06F 13/00* (2006.01)

(52) U.S. Cl.
USPC ............................................. 715/723; 725/46

(58) Field of Classification Search .................. 715/722, 715/723, 724, 725, 726, 727; 725/49, 46, 725/59
See application file for complete search history.

(56) References Cited

U.S. PATENT DOCUMENTS

| | | | | |
|---|---|---|---|---|
| 5,553,221 | A | * | 9/1996 | Reimer et al. ................. 715/720 |
| 5,610,653 | A | * | 3/1997 | Abecassis ..................... 348/170 |
| 5,664,046 | A | * | 9/1997 | Abecassis ..................... 386/206 |
| 6,172,675 | B1 | * | 1/2001 | Ahmad et al. ................. 715/251 |
| 6,904,408 | B1 | * | 6/2005 | McCarthy et al. ................. 705/2 |
| 2004/0098753 | A1 | * | 5/2004 | Reynolds et al. ............. 725/135 |
| 2004/0267816 | A1 | * | 12/2004 | Russek ..................... 707/104.1 |

FOREIGN PATENT DOCUMENTS

WO      WO 9938102 A1 *  7/1999

* cited by examiner

*Primary Examiner* — Kieu Vu
*Assistant Examiner* — Blaine Basom
(74) *Attorney, Agent, or Firm* — Hartman & Citrin LLC

(57) ABSTRACT

Virtual media environments are provided. A first set of media components is received and modified to create a first virtual media instance. The first virtual media instance is provided to a user via at least one media output device. Media parameters corresponding to the user are updated based on the first virtual media instance. A second set of media components is also received. The second set is modified based on the updated media parameters to create a second virtual media instance.

20 Claims, 8 Drawing Sheets

US 8,429,533 B2

SYSTEMS, METHODS, AND COMPUTER READABLE STORAGE MEDIA FOR PROVIDING VIRTUAL MEDIA ENVIRONMENTS

TECHNICAL FIELD

This application relates generally to the field of media presentations. More specifically, this application relates to systems and methods for providing virtual media environments.

BACKGROUND

Virtual environments allow a user to interact with a computer-simulated environment. Most current virtual environments are primarily visual experiences, displayed either on a computer screen or through special stereoscopic displays, but some simulations include additional sensory information, such as sound through speakers or headphones. Some advanced systems may include tactile information, generally known as force feedback, in medical and gaming applications. Users can interact with a virtual environment or a virtual artifact (VA) either through the use of standard input devices such as a keyboard and mouse, or through multimodal devices such as a wired glove. The virtual environment can be similar to the real world, for example, simulations for pilot or combat training, or it can differ significantly from reality, as in virtual reality games. In practice, it can be very expensive and time-consuming to create virtual environments that are specifically customized to individual users.

SUMMARY

Systems, methods, and computer readable storage media for providing virtual media environments are disclosed. Exemplary embodiments of a computer-implemented method for providing virtual media environments include receiving a first set of media components and modifying the first set of media components to create a first virtual media instance. The first virtual media instance is provided to a user via at least one media output device. Media parameters corresponding to the user are updated based on the first virtual media instance. A second set of media components is also received. The second set is modified based on the updated media parameters to create a second virtual media instance.

Other systems, methods, and/or computer readable storage media according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing virtual media environments. In the following detailed description, references are made to the accompanying drawings that form a part hereof, and which are shown by way of exemplary embodiments and implementations.

Figure 1:
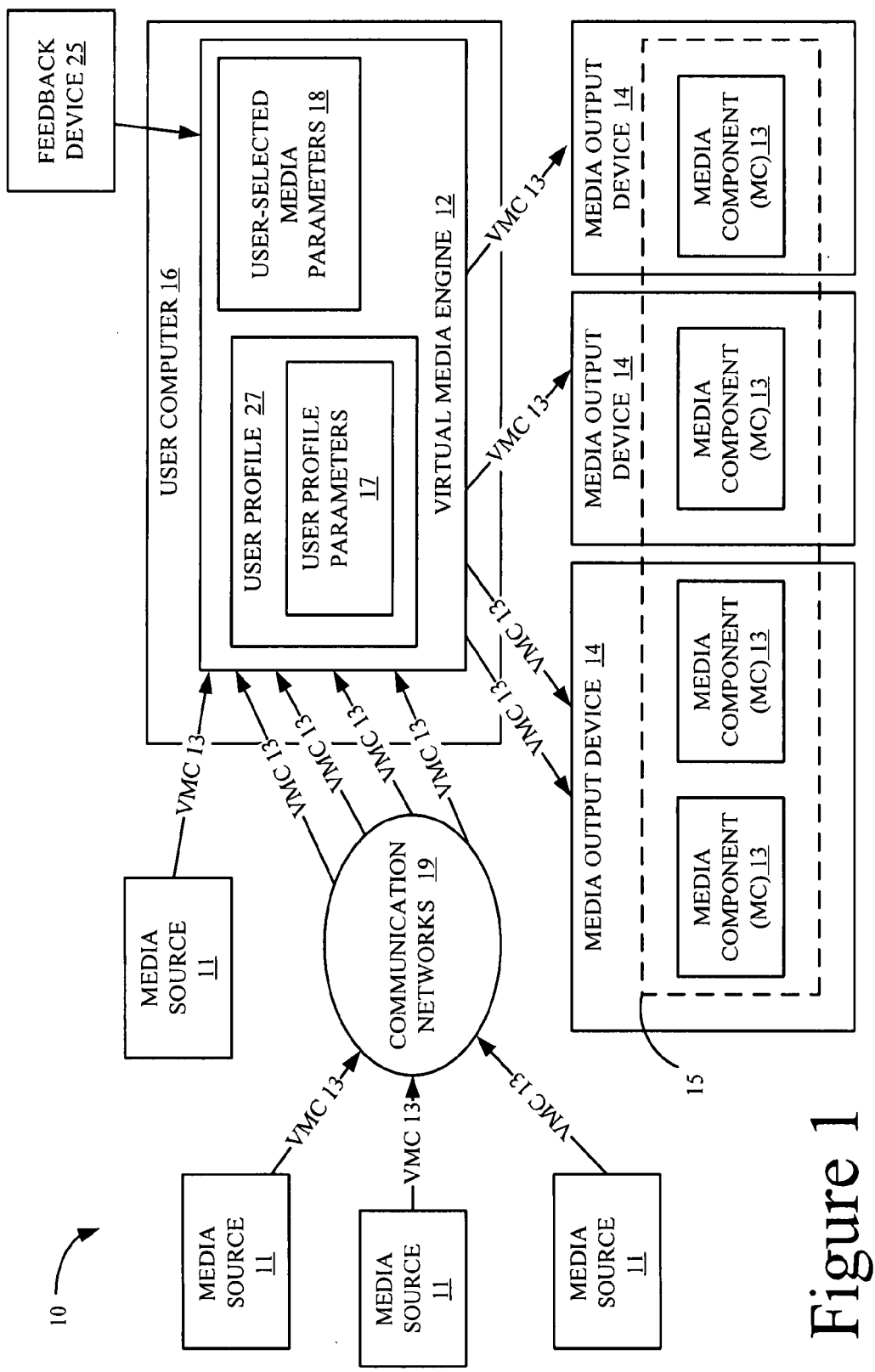
FIGS. 1 and 2 are block diagrams illustrating a media system, in accordance with exemplary embodiments.

FIG. 1 is a block diagram illustrating a media system 10, in accordance with exemplary embodiments. The media system 10 includes media sources 11, media output devices 14, and a user computer 16. Each media source 11 may be located remotely from or near the user computer 16. According to exemplary embodiments, the user computer 16 includes a virtual media engine 12 configured to create a virtual media instance 15 comprising media components 13. The virtual media engine 12 may receive the media components 13 from various media sources 11 either directly or via one or more communication networks 19. The communication networks 19 may comprise, for example, a local area network, a mobile wireless network, a public switched telephone network, a peer-to-peer (P2P) network, an ad-hoc network, and/or the Internet.

The media components 13 may comprise any data (e.g., audio, visual, and/or textual data) or instructions (e.g., scripts) configured to enable the media output devices 14 to provide outputs that stimulate one or more user senses, such as for example, visual, auditory, tactile, olfactory, and gustatory. For example, the media components 13 may comprise a movie, a picture, a song, a video game, and/or a television program. Furthermore, the media components 13 may be in any desired format now known or later developed. As a non-limiting example, the media components 13 comprising a video stream may be in a Moving Picture Experts Group (MPEG) format. The media output devices 14 may comprise, for example, a display device, a speaker, a mobile wireless communication device, an odor output device, a tactile output device, a body stimulating electrode, a moving and/or vibrating chair, a heating and/or cooling system, a fan, a flavor dispenser, a liquid sprayer, and/or any other device capable of providing outputs that stimulate one or more user senses.

Each media source 11 may be any device capable of providing a media component, such as the media component 13, that can be used to create the virtual media instance 15. The media sources 11 may include for example, a computer, a motion sensing device, a microphone, a mobile wireless communication device, a biometric measurement device, a thermostat, an odor sensing device, a still camera, a video camera, and/or a server. Furthermore, the media sources 11 may be located in various locations including, for example, among others, a residence, a park, an office, a library, a government building, a ship, and airplane, a school, a museum, an automobile, a stadium, a restaurant, a shop, a mall, a theme park, and a movie theater.

According to exemplary embodiments, the virtual media instance 15 comprises two or more media components received from respective media sources 11. The virtual media engine 12 may combine and/or modulate (i.e., modify) the media components 13 based on user-selected media parameters 18 and/or a user profile parameters 17 to create the virtual media instance 15. For example, the color of an image in a media component 13 may be brightened in accordance with a user preference for brighter colors prior to being included in the virtual media instance 15, which may include several images corresponding to respective media components 13. The virtual media engine 12 may also coordinate and/or synchronize the output of the media components in accordance with the user-selected media parameters 18 and/or the user profile parameters 17.

The user-selected media parameters 18 and/or the user profile parameters 17 may specify characteristics for the media component 13 and/or the corresponding virtual media instance 15 as a whole. The user-selected media parameters 18 are specified by user input in connection with the current virtual media instance 15 whereas the user profile parameters 17 are based on user preferences for previously presented virtual media instances 15. After a user creates and/or experiences the virtual media instance 15, parameters corresponding to the virtual media instance 15 may be added to the user profile parameters 17 either automatically or responsive to user input. The user profile parameters 17 may be part of a user profile 27.

The user-selected media parameters 18 and/or the user profile parameters 17 may specify media presentation and/or content characteristics including, for example, parameters related to shapes, colors, sounds, smells, scenes, songs, poems, words, movies, television programs, foods, drinks, books, magazines, web-sites, web-pages, video games, locations, clothes, languages, companies, events, objects, name brands, countries, emotions, moods, themes, scenes, genres, image resolutions, actors, musicians, politicians, athletes, weather, genders, religions, activities, hobbies, media sources, dates, ages, eras, art, artists, sensations, animated characters, technologies, ethnicities, occupations, animals, music, horoscopes, personalities, and/or personal traits.

Each media characteristic may have several parameters, such as the parameters 17, 18, that specify various aspects of the characteristic. For example, the parameters 17, 18 for specifying color characteristics of the virtual media instances 15 and/or the media components 13 may include hue, saturation, and brightness. Similarly, the parameters 17, 18 for specifying sound characteristics for the virtual media instances 15 and/or the media components 13 may include volume, tone, bass, balance, and fade. Note that there may be a different overall set of parameters for the virtual media instances 15 than for the media components 13, depending on a desired implementation.

Parameter weighting factors may be associated with the user profile parameters 17 and/or user-selected parameters 18. The parameter weighting factors may be specified by a user and/or may be determined based on a frequency and/or duration that parameters 17, 18 are used or detected in the virtual media instance 15 created and/or experienced by a user. Parameter weighting factors may be used to provide precedence to more highly weighted parameters when the virtual media engine 12 is being used to search for, create and/or modulate the virtual media instances 15.

As a non-limiting example, a higher weight may be assigned to a comedy theme movie parameter than to a drama theme movie parameter if the user creates more virtual media instances, such as the virtual media instance 15, comprising a movie having a comedy theme than virtual media instances comprising a movie having a drama theme. Based on the higher weight assigned to the comedy theme movie parameter, the virtual media engine 12 may be more likely to find and retrieve the virtual media instance 15 and/or the media component 13 comprising a comedy movie in response to a user request to the virtual media engine 12 to find a virtual media instance that corresponds to the user's preferences. Parameter weighting may additionally or alternatively be used to resolve parameter conflicts corresponding to the virtual media instance 15 and/or the media components 13. For example, if two media components 13 having soundtracks are combined, a soundtrack corresponding to the media component 13 having a lower weighted theme parameter may be muted so as not to interfere with a soundtrack corresponding to the media component 13 having a higher weighed theme parameter.

According to exemplary embodiments, the virtual media instance 15 created by the virtual media engine 12 is output to the media output device 14 as a combination of integrated and/or non-integrated media components, such as the components 13. For example, the virtual media engine 12 may combine various video streams to form a single video stream that is output to a video display device while also outputting a sound stream that is not combined with other sound streams. Furthermore, the virtual media instance 15 may comprise the media components 13 having a wide variety of media formats. As a non-limiting example, images corresponding to the virtual media instance 15 output by the virtual media engine 12 may be formatted as PDF, JPEG, and TIFF images.

The virtual media instance 15 may comprise different types of the media components 13. For example, the virtual media instance 15 may comprise a first media component, such as the component 13 corresponding to a three-dimensional (3D) video game received from a first media source, such as the media source 11, a second media component corresponding to a movie received from a second media source, a third media component corresponding to a television program received from a third media source, and a fourth media component corresponding to a still image received from a fourth media source. The virtual media engine 12 may then combine and/or modulate these media components 13 based on the user profile parameters 17 and/or the user-selected parameters 18.

The virtual media engine 12 may be configured, for example, to combine and modulate the media components 13 to create a virtual media instance, such as the virtual media instance 15, in which the movie and the television program are displayed at different virtual locations within the 3D video game that is output via one or more display devices, such as the media output devices 14. According to exemplary embodiments, the user would be able to navigate the 3D video game using a user-input device to arrive at the virtual locations of the movie, television program, and/or still image within the 3D video game.

The virtual media engine 12 may be configured to cause the volume of a sound stream corresponding to the movie to be modulated responsive to the user profile parameters 17 and/or the user-selected parameters 18. The user-selected parameters 18 may specify, for example, that as the user navigates closer to a virtual screen displaying the movie within the 3D video game, the virtual media engine 12 is to cause the sound corresponding to the movie to increase. As another example, the user may specify that a sound level is to be reduced as the user moves closer to a sound source and/or a display device. The virtual media engine 12 may determine a relative location of a user based on data received from a feedback device 25 attached the user. The feedback device 25 may provide location information to the virtual media engine 12 via RF signals.

The colors and resolution corresponding to the movie, television program, and/or still image described in the above example may also be modulated based on the user profile 17 and/or the user-selected parameters 18. For example, if a user has a specified preference for black and white video and a specified preference for color still images, then the movie and the television program may be displayed in black and white while the still image may be displayed in color.

The virtual media engine 12 may also be configured (e.g., based on the user profile parameters 17 and/or user-selected parameters 18) to provide the media components 13 for enabling tactile, olfactory, and/or gustatory stimulation. For example, the virtual media engine 12 may be configured, to cause a vibrating chair to vibrate responsive to certain sounds corresponding to the television program, movie, and/or video game output by the virtual media engine 12. As another example, the user-selected parameters 18 may specify that a flowery smell is to be released by an odor releasing device when an image of a flower is output by the virtual media engine 12. A tagging mechanism, such as, for example, meta tags, may be used to enable the virtual media engine 12 to determine the content of the media components 13 being output to the media output devices 14.

The virtual media instance 15 may be dynamically modulated based on a user characteristic such as, for example, a user's mood. A bio-feedback device, such as the feedback device 25, that estimates a user's mood may provide the virtual media engine 12 with information regarding the user's mood. The bio-feedback device may estimate a user's mood based on measurements corresponding to blood pressure, pulse, facial movements, muscle tension, brain activity, and/ or any other desired bio-feedback parameters. The bio-feedback device may be connected to the computer or may communicate with the computer 16 via a network, such as a wireless local area network.

The virtual media engine 12 may then modulate the sights (e.g., colors and shapes), sounds (e.g., audio volume and pitch) and other sensory outputs of the media output devices 14 responsive to the bio-feedback information. The virtual media engine 12 may even select the media components 13 that are to be provided to the user responsive to the bio-feedback information. For example, the media components 13 corresponding to a comedy theme may be provided if the user is determined to be in a positive mood. The user profile parameters 17, the user-selected parameters 18, and/or pre-programmed parameters of the virtual media engine 12 may be used to determine the manner in which selections, combinations and/or modulations are to be implemented responsive to the bio-feedback information.

The virtual media engine 12 may be configured to dynamically select, combine and/or modulate the media components 13 based on changes to a user's condition responsive to the media components 13 currently being provided by the virtual media engine 12. For example, the virtual media engine 12 may provide additional media components, such as the media components 13, having a certain characteristic if it is determined that a user is responding positively (based on bio-feedback) to media components having a similar characteristic.

Additionally or alternatively, the virtual media engine 12 may continue to modulate the media components 13 in a particular manner if the virtual media engine 12 determines that the user is responding positively to similar modulations. For example, if a user is responding positively to certain changes in image color or audio volume, then the virtual media engine 12 may continue to implement such changes until a certain predetermined limit is reached or until it is determined that the user is no longer responding positively to such changes.

The virtual media engine 12 may be configured to combine the virtual instances 15 responsive to user input based on the user profile parameters 17, and/or user-selected parameters 18. For example, the virtual media engine 12 may select items from each virtual instance 15 that most closely match user profile parameters 17 and/or user-selected parameters 18 to create another virtual media instance 15. The virtual media engine 12 may store a copy of the virtual media instance 15 or specifications corresponding thereto so that the virtual media instance 15 may be provided to a user at a later time. Additionally or alternatively, the virtual media instance 15 that is a result of combining other virtual media instances 15 may be modulated based on the user profile parameters 17 and/or the user-selected parameters 18.

Parameter conflicts may arise, for example, when the user profile parameters 17 are to be updated based on a newly created and/or experienced media instance, such as the instance 15, since the media instance 15 may have different parameters than those already present in the user profile parameters 17. As a non-limiting example, if the new virtual media instance 15 created and/or experienced by a user includes a "black and white" movie whereas the user profile parameters 17 had specified a user preference for color movies, then a conflict may arise when the user profile parameters 17 are to be updated based on the new virtual media instance 15. Other parameter conflicts may arise when a user requests that the virtual media engine 12 combine a first media instance, such as the media instance 15, with a second media instance since conflicting combinations and/or modulations may occur based on the user profile parameters 17 and/or the user-selected parameters 18 associated with the media instances 15.

Conflicts between parameters may be resolved based on pre-determined and/or user determined guidelines. A conflict may be resolved by either prompting the user to specify a preference or by using a predetermined rule. A conflict resolution rule may specify, for example, whether parameters and characteristics corresponding to a prior preference take precedence over parameters and characteristics corresponding to the newly created and/or experienced virtual media instance 15.

A weighting system may be used to determine a user preference based on a frequency, timing, and/or duration corresponding to parameters of the virtual media instances 15 created and/or experienced by the user. For example, parameter values that correspond to media that is experienced more often or more recently by a user may be given a higher weight, and hence precedence, over parameters values that correspond to media that is experienced less often or less frequently by the user.

Figure 2:
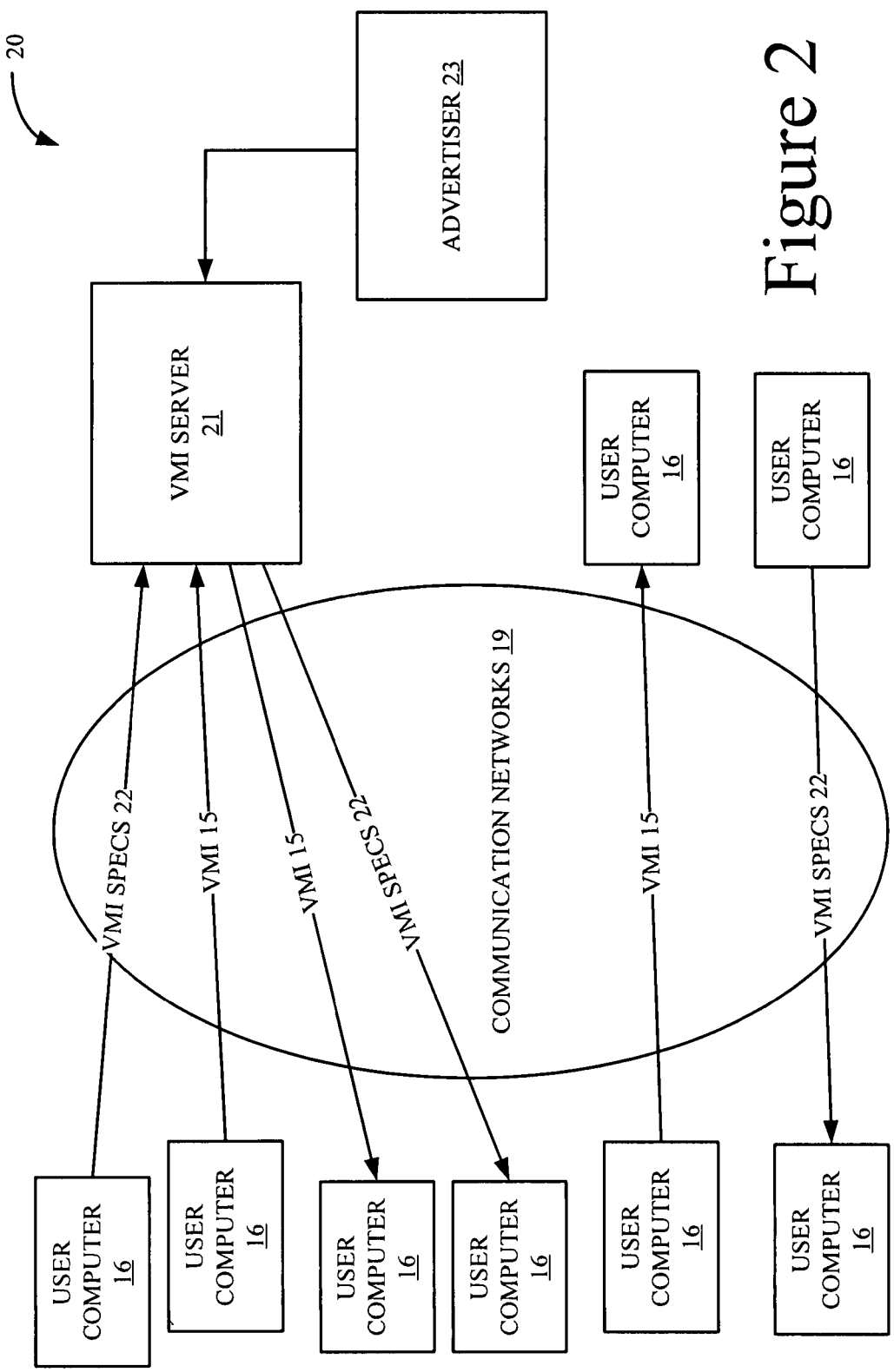

FIG. 2 is a block diagram illustrating a media system 20, in accordance with exemplary embodiments. The media system 20 includes the user computers 16 and a virtual media server 21. A user can share the virtual media instance 15 and/or virtual media instance specifications 22 with other users. According to exemplary embodiments, the media instance specifications 22 describe the contents, sources, and/or characteristics of the virtual media instance 15 in sufficient detail so as to enable a virtual media engine, such as the virtual media engine 12, associated with the user computer 16 to recreate the virtual media instance 15. The user computer 16 may transmit the virtual media instance 15 and/or the virtual media instance specifications 22 to the virtual media server 21 and/or to another user computer 16. The virtual media server 21 may provide the virtual media instance 15 and/or the virtual media instance specifications 22 to other user computers 16.

A user who receives the virtual media instance 15, may experience the virtual media instance 15 or a modified version thereof via the user's media output devices 14 associated with user computer 16. The virtual media instance 15 may be modified based on parameters defined by the receiving user's profile parameters 17 and/or user-selected parameters 18. A user that receives the virtual media instance specifications 22 may use the virtual media instance specifications 22 to create a corresponding virtual media instance, such as the instance 15. A user may alternatively modify the virtual media instance specifications 22 to create a modified virtual media instance, such as the instance 15.

A user experiencing the virtual media instance 15 provided by another user via the other user's computer 16 or via the virtual media instance server 21 may provide user feedback regarding the virtual media instance 15. The user feedback may comprise comments and/or ratings. The ratings provided by users for the virtual media instances 15 may be available for other users to view. For example, user ratings may be averaged and/or summarized in order to produce a star rating or score for the virtual media instance 15.

The virtual media instance 15 may be sold, licensed, subscribed to, and/or syndicated. For example, a user may be required to pay a fee in order to experience the virtual media instance 15 created by the other user. The virtual media instances 15 receiving a higher rating may, for example, require a higher payment than those receiving a lower rating. Users may subscribe to the virtual media instances 15 provided by another user and/or by an operator of the virtual media instance server 21 and be entitled to receive limited or unlimited access to the virtual media instances 15. Users may also provide the virtual media instances 15 and/or the virtual media instance specifications 22 in exchange for other virtual media instances 15 and virtual media instance specifications 22 provided by other users.

An advertiser 23 may provide advertising content via the virtual media instances 15 and/or the virtual media instance specifications 22. The advertiser 23 may be required to pay the person or entity owning legal rights to the virtual media instance 15 and/or the operator of the virtual media instance server 21 in order to be entitled to provide advertising content via the virtual media instance 15. The advertising content provided by the advertiser 23 may be, for example, in the form of visual, auditory, and/or textual content that is integrated into the virtual media instance 15 or virtual media instance specifications 22.

Figure 3:
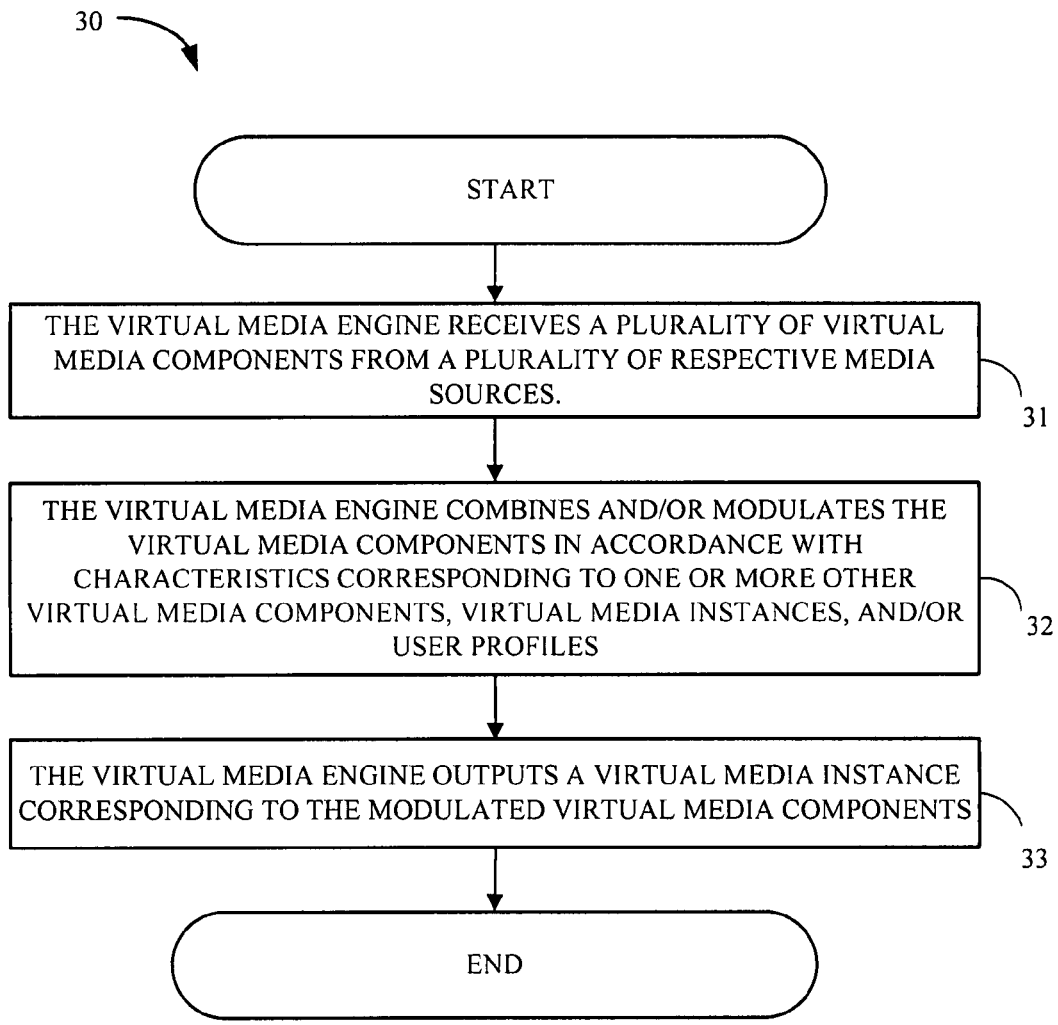
FIGS. 3-7 are flow charts illustrating methods for providing virtual media, in accordance with exemplary embodiments.

FIG. 3 is a flow chart illustrating a method 30 for providing virtual media, in accordance with exemplary embodiments. As indicated in block 31, the virtual media engine 12 receives a plurality of media components, such as the components 13, from a plurality of respective media sources, such as the media sources 11. The media components 13 may be provided to the virtual media engine 12 responsive to requests by the virtual media engine 12 for the components 13. As discussed above, the media components 13 may comprise data and/or code configured to enable the media output devices 14 to provide outputs that stimulate one or more user senses, such as for example, visual, auditory, tactile, olfactory, and gustatory.

The virtual media engine 12 combines and/or modulates the media components 13 in accordance with characteristics corresponding to one or more of the media components 13, virtual media instances 15, and/or user profiles, as indicated in block 32. For example, the user-selected media parameters 18 and/or the user profile parameters 17 may be used to determine how the media components 13 are to be modulated. Additionally or alternatively, a user may select the media component 13 and/or the virtual media instance 15 to be used as a model or guide for creating and/or modulating other virtual media instances 15.

The virtual media engine 12 outputs the virtual media instance 15 corresponding to the combined and/or modulated media components 13, as indicated in block 33. The virtual media instance 15 may be output to the media output devices 14 such as, for example, a display device, a speaker, and/or other media devices described above.

Figure 4:
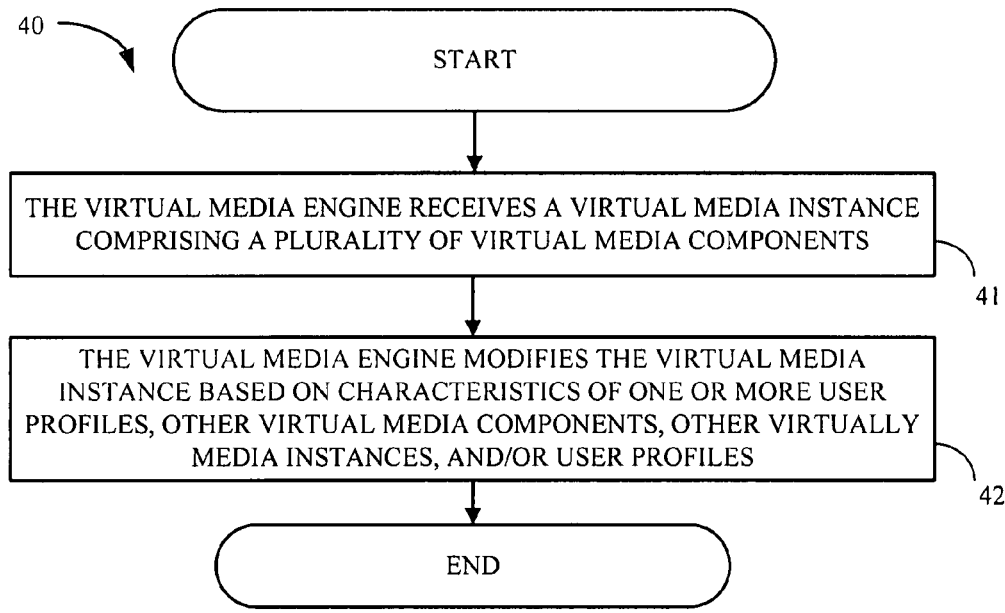

FIG. 4 is a flow chart illustrating a method 40 for providing virtual media, in accordance with exemplary embodiments. As indicated in block 41, the virtual media engine 12 receives the virtual media instance 15 comprising a plurality of media components. The virtual media instance 15 may be created and/or provided, for example, by a remote user via another virtual media engine 12. The virtual media engine 12 then modifies the virtual media instance 15 based on characteristics of one or more user profiles, other media components 13, and/or other virtual media instances 15, as indicated in block 42. The virtual media engine 12 may, for example, combine selected media components, such as the components 13, from a first virtual media instance 15 with selected media components, such as the components 13, from a second virtual media instance 15 in order to generate a third virtual media instance 15. The components 13 may be selected, combined, and/or modulated based on, for example, the user profile parameters 17 and/or the user-selected parameters 18.

Figure 5:
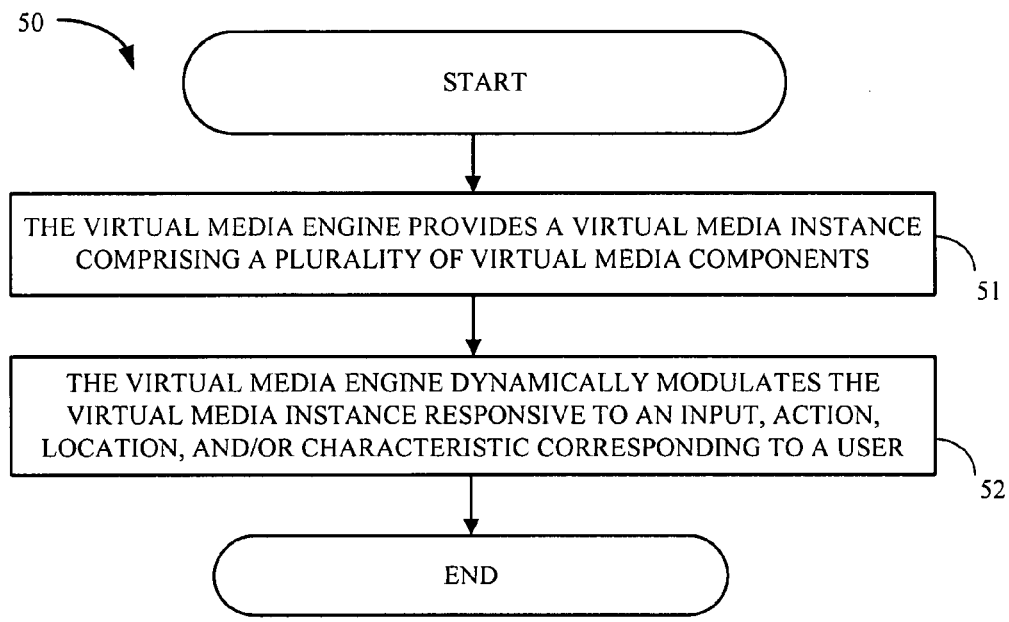

FIG. 5 is a flow chart illustrating a method 50 for providing virtual media, in accordance with exemplary embodiments. As indicated in block 51, the virtual media engine 12 provides the virtual media instance 15 comprising a plurality of the media components 13. The virtual media engine 12 dynamically modulates the virtual media instance 15 responsive to an input, action, location, and/or characteristic corresponding to a user, as indicated in block 52. The virtual media engine 12 may, for example, modulate the shapes, colors, and sounds corresponding to the virtual media instance 15 responsive to user characteristics being measured while the virtual media engine 12 is outputting the virtual media instance 15. As described above, the measured user characteristics may include, for example, the user's location relative to the media output device 14 and/or the user's mood.

Figure 6:
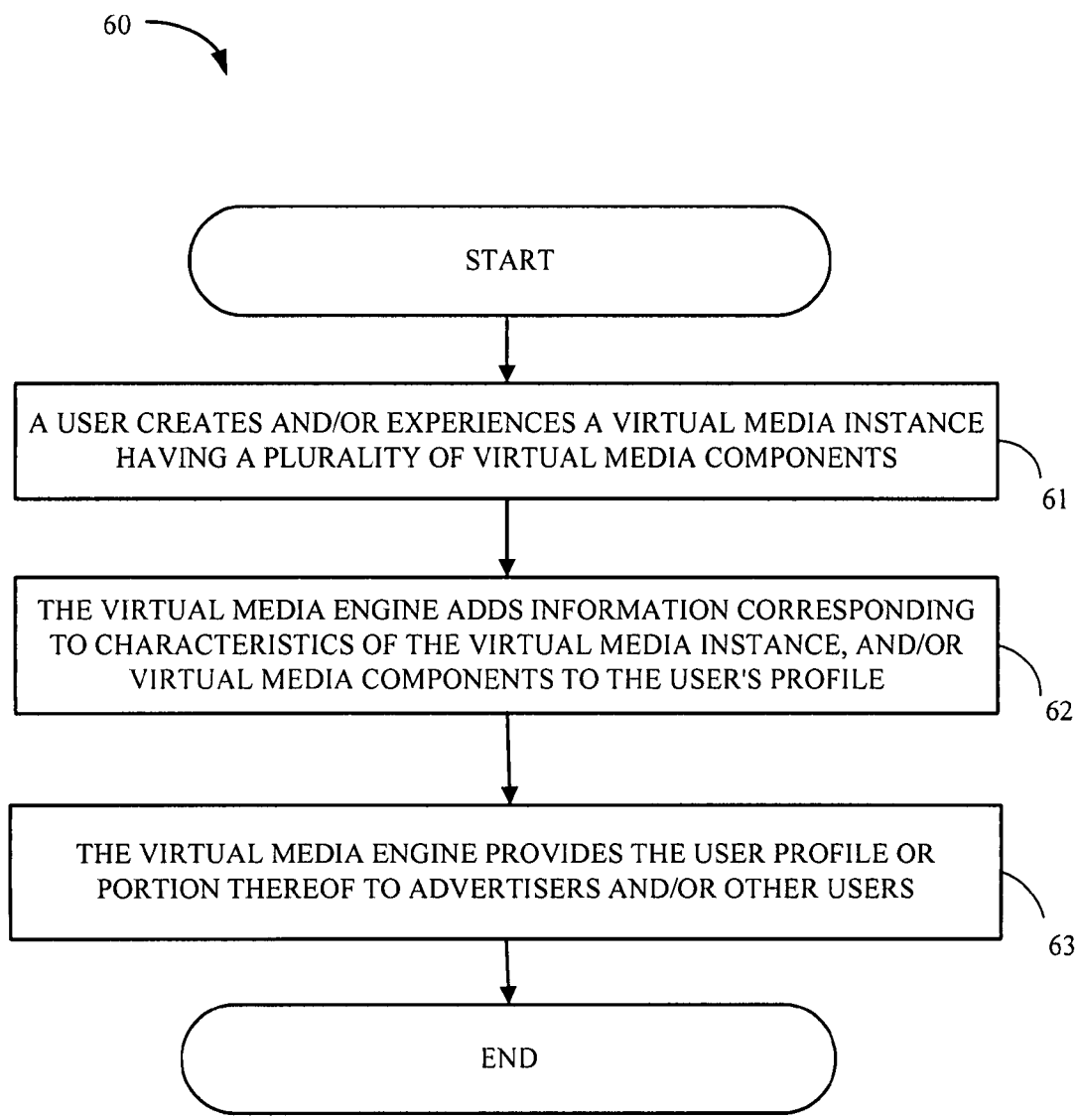

FIG. 6 is a flow chart illustrating a method 60 for providing virtual media, in accordance with exemplary embodiments. As indicated in block 61, a user creates and/or experiences the virtual media instance 15 having a plurality of the media components 13. Each media component 13 may have one or more tags (e.g., meta tags) associated therewith. The meta tags describe respective characteristics of the media components 13.

The virtual media engine 12 adds information corresponding to characteristics of the virtual media instance 15, and/or the media components 13 to the user profile parameters 17, as indicated in block 62. The information added to the user profile parameters 17 may specify, for example, how the media components 13 were combined and/or modulated to create the virtual media instance 15. The information may be based on meta tags associated with the virtual media instance 15 and/or the media components 13. The user profile parameters 17 are updated to better reflect user preferences related to the virtual media instance 15 and/or the media components 13. The information may be added to the user profile parameters 17 responsive to, for example, a user providing user input permitting the information to be added.

The virtual media engine 12 provides the user profile parameters 17 or a portion thereof to advertisers, such as the advertisers 23, and/or other users, as indicated in block 63. A user may be able to specify whether the user profile parameters 17 may be provided to the advertisers 23 and/or other users. The user may also be able to specify which portions of a user profile are to be kept confidential and hence not shared with others.

The advertisers 23 may use information from the user profile parameters 17 to determine advertising content to be provided to the user in connection with the virtual media instances 15 created and/or experienced by the user. Other users may use information from the user profile parameters 17 to determine whether to receive and/or experience the virtual media instances 15 created and/or experienced by the user.

Figure 7:
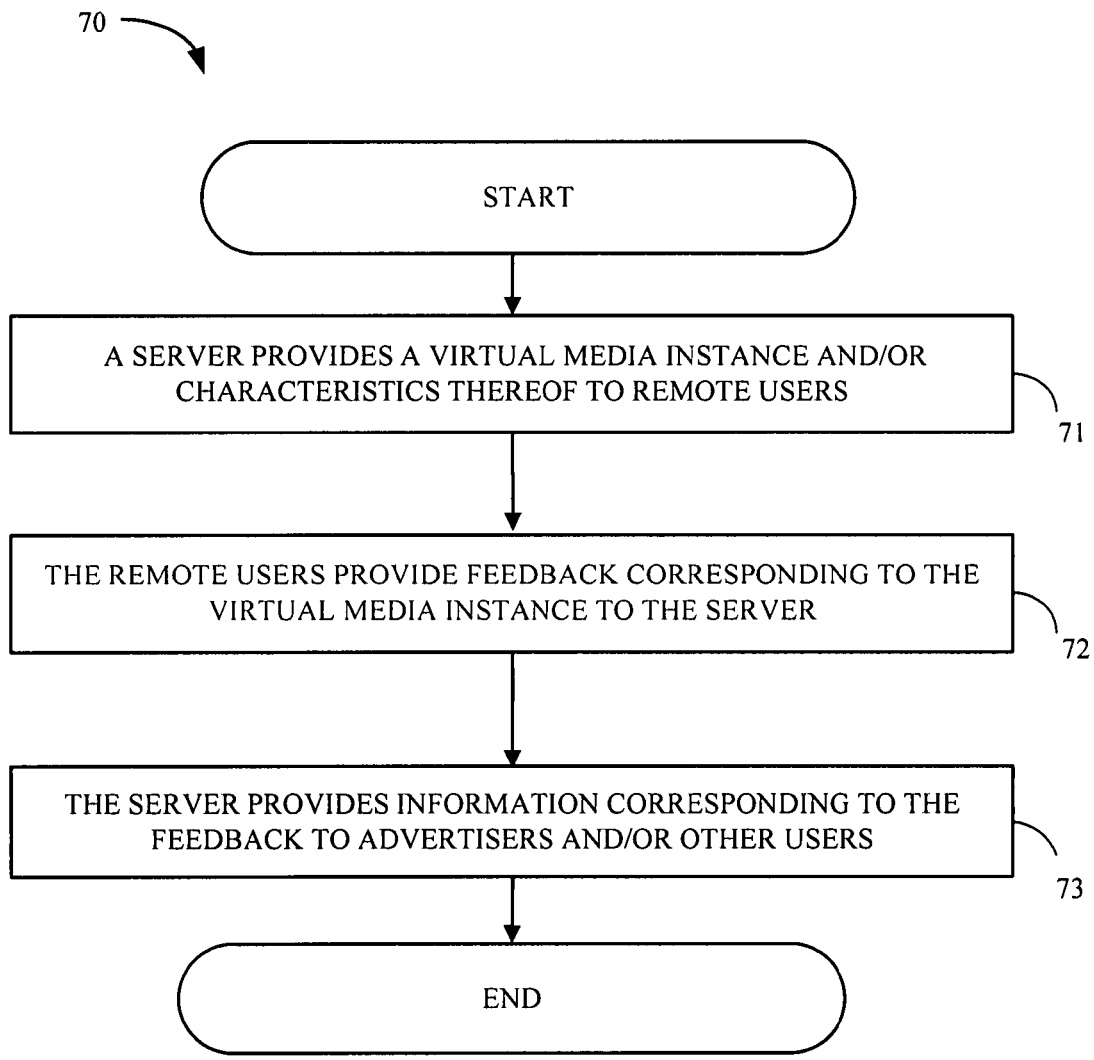

FIG. 7 is a flow chart illustrating a method 70 for providing virtual media, in accordance with exemplary embodiments. As indicated in block 71, the server 21 provides the virtual media instance 15 and/or the virtual media instance specifications thereof to remote users. The virtual media instance 15 may have been provided to the server 21 by a user computer, such as the user computer 16. The server 21 may be configured to provide the virtual media instance 15 to certain users who have subscribed to a service that entitles such users to access the virtual media instance 15. After experiencing the virtual media instance 15, the remote users then provide feedback corresponding to the virtual media instance 15 to the server 21, as indicated in block 72. The feedback may be in the form of, for example, comments and/or ratings.

The server 21 then provides information corresponding to the feedback to advertisers, such as the advertiser 23, and/or other users, as indicated in block 73. The server 21 may, for example, provide summarized ratings so that other users can determine which of the virtual media instances 15 to receive and/or experience.

The advertisers 23 may use ratings to determine which of the virtual media instances 15 to advertise through. Advertising fees paid by the advertisers 23 may be based on the ratings of the corresponding virtual media instances 15 and/or the frequency with which the virtual media instances 15 are provided to users. The advertisers 23 may provide the server 21 with advertising content to be included in the virtual media instances 15.

Note that methods depicted in the exemplary flow charts described above may be modified to include fewer, additional, and/or different steps within the scope of this disclosure. Furthermore, steps depicted in the flow charts may be performed out of the order shown including substantially concurrently, in reverse order, or in a substantially different order.

Figure 8:
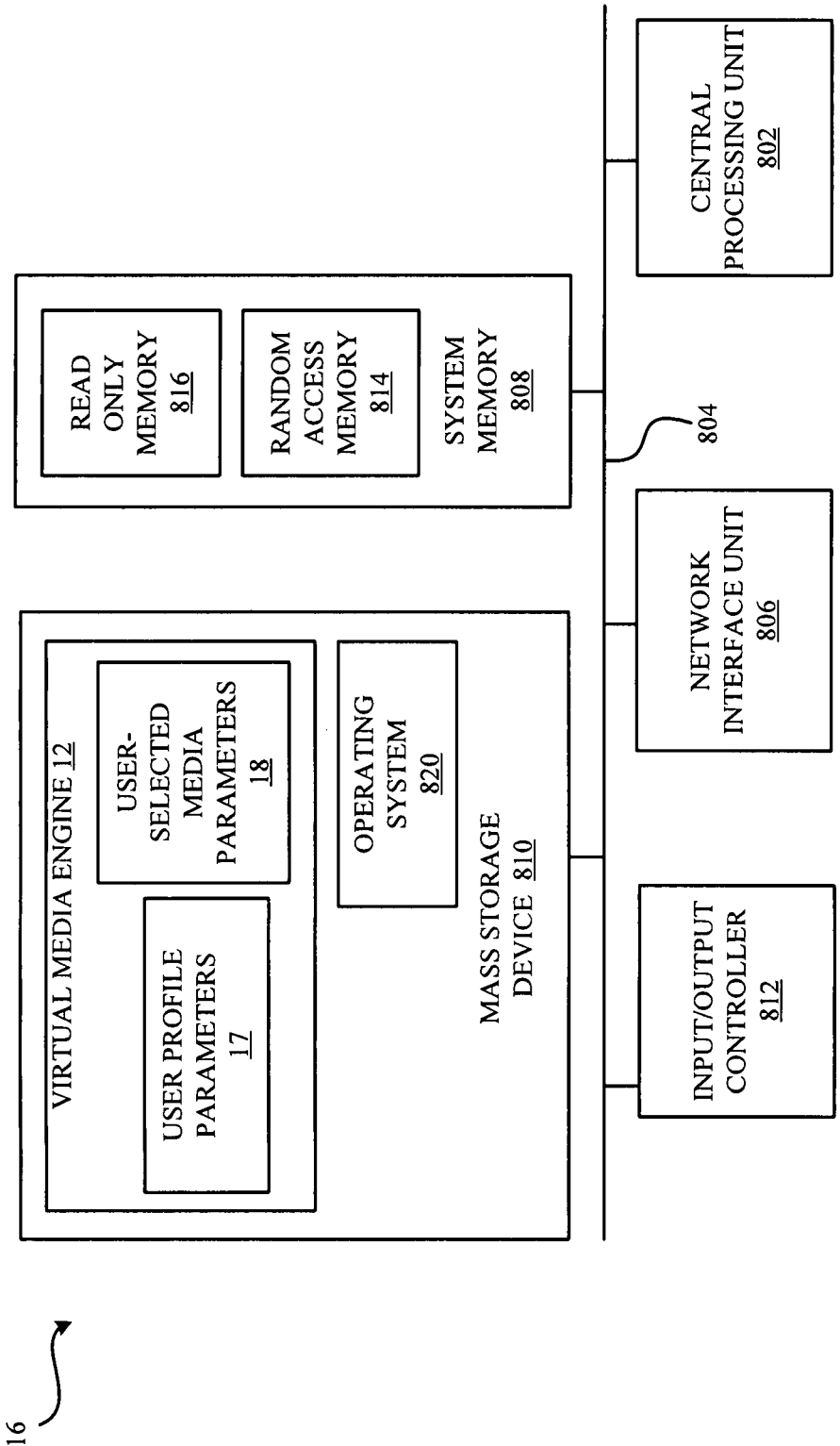
FIG. 8 is a block diagram illustrating a user computer, in accordance with exemplary embodiments.

FIG. 8 is a block diagram illustrating the computer 16, in accordance with exemplary embodiments. The computer 16 includes a central processing unit 802 (CPU), a system memory 808, including a random access memory 814 (RAM) and a read-only memory (ROM) 816, and a system bus 804 that couples the memory 808 to the CPU 802. A basic input/output system containing the basic routines that help to transfer information between elements within the computer 16, such as during startup, is stored in the ROM 816. The computer 16 further includes a mass storage device 810 for storing an operating system 820 and other program modules, which will be described in greater detail below.

The mass storage device 810 is connected to the CPU 802 through a mass storage controller (not shown) connected to the bus 804. The mass storage device 810 and its associated computer-readable media provide non-volatile storage for the computer 16. Although the description of computer-readable media contained herein refers to a mass storage device, such as a hard disk or CD-ROM drive, it should be appreciated by those skilled in the art that computer-readable media can be any available media that can be accessed by the computer 16.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 16.

The computer 16 may connect to the network 19 through a network interface unit 806 connected to the bus 804. It should be appreciated that the network interface unit 806 may also be utilized to connect to other types of networks and remote computer systems. The computer 16 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device, such as the media output devices 14 (also not shown in FIG. 8).

A number of program modules and data files may be stored in the mass storage device 810 and RAM 814 of the computer 16, including the operating system 820 suitable for controlling the operation of the computer 16. The mass storage device 810 and RAM 814 may also store one or more program modules. In particular, the mass storage device 810 and the RAM 814 may store the virtual media engine 12 configured to create the virtual media instances 15.

As described above, the virtual media engine 12 combines and/or modulates the media components 13 based on the user-selected media parameters 18 and/or the user profile parameters 17 to create the virtual media instance 15, according to exemplary embodiments. The user-selected media parameters 18 and/or the user profile parameters 17 may specify characteristics for the individual media components 13 and/or the corresponding virtual media instance 15 as a whole. After a user creates and/or experiences the virtual media instance 15, parameters corresponding to the virtual media instance 15 may be added to the user profile parameters 17 either automatically or responsive to user input. Note that the user-selected media parameters 18 and/or the user profile parameters 17 may alternatively be stored remotely from the computer 16 and accessed by the media engine 12 via, for example, the network 19.

Figure 9:
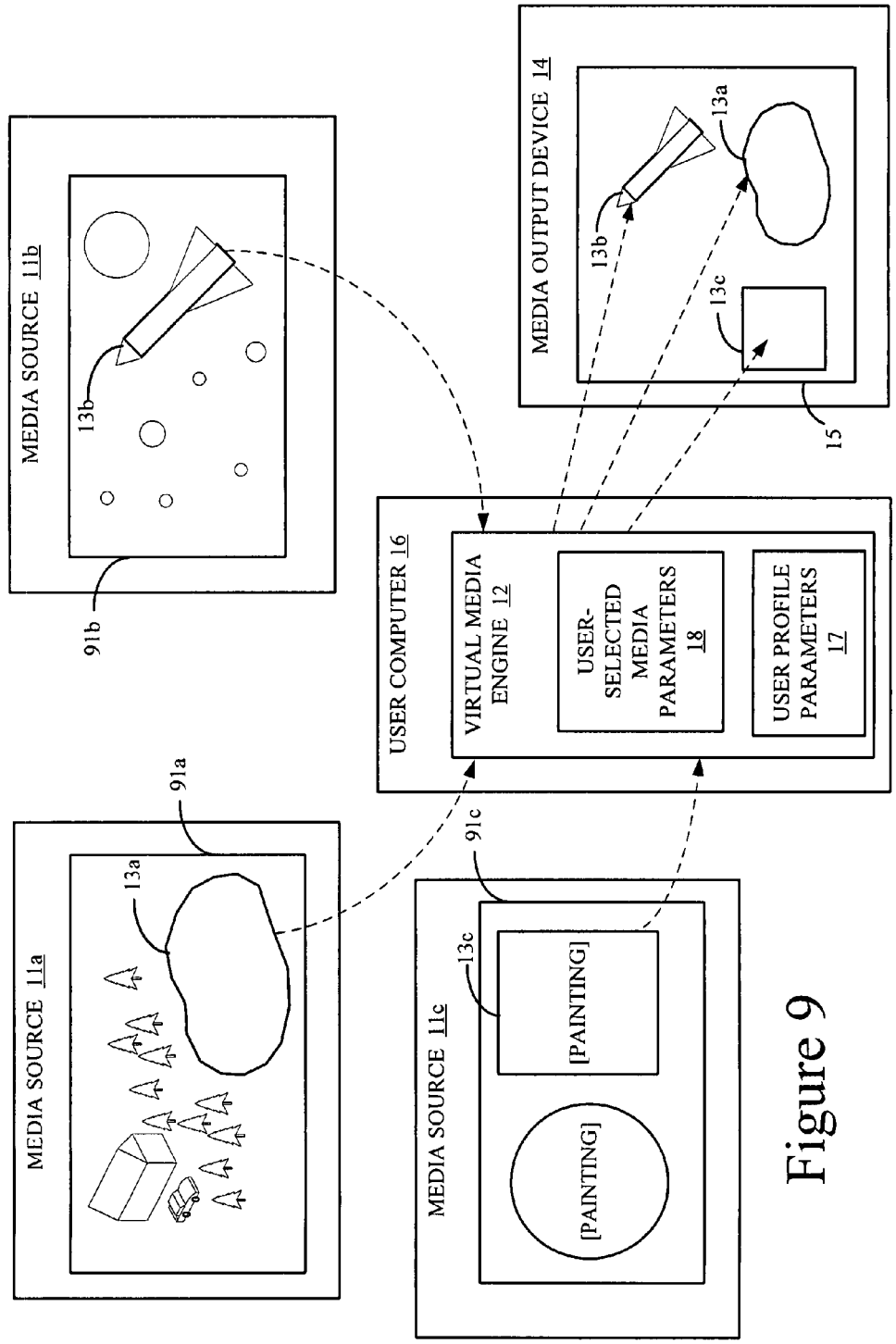
FIG. 9 is a schematic diagram illustrating an example of how media components may be combined to create a virtual media instance.

FIG. 9 is a schematic diagram illustrating an example of how the media components 13 may be combined to create the virtual media instance 15. According to the example shown in FIG. 9, the virtual media instance 15 comprises the media components 13a, 13b, and 13c that are received from respective media sources, such as the media sources 11a, 11b, and 11c. The media components 13a, 13b, and 13c correspond to respective media presentations, such as the media presentations 91a, 91b, and 91c that are stored at the respective media sources 11a, 11b, and 11c. The media presentations 91a, 91b, and 91c may also include other media components that are not included in the virtual media instance 15. In this example, the media component 13a corresponds to an image of a lake, the media component 13b corresponds to an image of a rocket ship, and the media component 13c corresponds to an image of a painting.

The virtual media engine 12 combines and modulates the media components 13a, 13b, and 13c based on the user-selected media parameters 18 and/or the user profile parameters 17 to create the virtual media instance 15. For example, the virtual media engine 12 may brighten the color of the media component 13a based on the user selected media parameters 18, and may reduce the size of the media component 13c based on the user profile parameters 17.

Audio corresponding to one or more of the media presentations 91a, 91b, and 91c may also be received from a respective media source, such as the media source 11b, and then output by a media output device, such as the media output device 14. Alternatively audio from another media source 11 other than the media sources 11a, 11b, and 11c may be output by the media output device 14 in conjunction with the virtual media instance 15.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims. Various modifications and changes may be made to the subject matter described herein without following the example embodiments and applications illustrated and described, and without departing from the true spirit and scope of the embodiments, which is set forth in the following claims.

What is claimed is:

1. A method for providing virtual media environments, comprising:
   receiving, at a processor, a first plurality of media components, the first plurality of media components comprising a first media component and a second media component;
   determining, by the processor, that a portion of the first media component and a portion of the second media component conflict when the first media component and the second media component are combined;
   determining, by the processor, a first weighting parameter associated with the first media component and a second weighting parameter associated with the second media component based on first media parameters corresponding to a first user, the first weighting parameter less than the second weighting parameter; and
   modifying, by the processor, the first plurality of media components to create a first virtual media instance, wherein modifying the first plurality of media components comprises combining the first media component and the second media component and eliminating the portion of the first media component in favor of the portion of the second media component based on the first weighting parameter associated with the first media component being less than the second weighting parameter associated with the second media component.

2. The method of claim 1, further comprising:
   determining characteristics of the first virtual media instance;
   updating the first media parameters corresponding to the first user with information corresponding to the characteristics of the first virtual media instance;
   receiving a second plurality of media components; and
   modifying the second plurality of media components based on the first media parameters updated to create a second virtual media instance.

3. The method of claim 2, wherein the first and second virtual media instances are for stimulating at least three of visual, auditory, tactile, olfactory, and gustatory user senses.

4. The method of claim 1, wherein the first weighting parameter associated with the first media component and the second weighting parameter associated with the second media component are based on how frequently a first parameter associated with the first media component is used when virtual media instances associated with the first user are created in comparison to how frequently a second parameter associated with the second media component is used when the virtual media instances associated with the first user are created.

5. The method of claim 1, further comprising:
   receiving from a remote user device a request for specifications corresponding to the first virtual media instance; and
   providing the specifications to the remote user device, wherein the specifications are used by the remote user device to create the first virtual media instance.

6. The method of claim 1, further comprising:
   receiving from a remote user device a request for the first virtual media instance; and
   providing the first virtual media instance to the remote user device, wherein second media parameters corresponding to a second user of the remote user device are updated based on the first virtual media instance, and wherein a second virtual media instance created by the remote user device is based on the second media parameters updated based on the first virtual media instance.

7. The method of claim 1, further comprising:
   providing the first virtual media instance to the first user via a media output device;
   receiving feedback associated with the first user regarding the first virtual media instance from a feedback device located in a proximity of the user, wherein the feedback comprises at least one of a blood pressure of the first user, a pulse of the first user, facial movements of the first user, muscle tension of the first user, brain activity of the first user, or location of the first user; and
   updating the first media parameters corresponding to the feedback received.

8. A system for providing virtual media environments, comprising:
   a processor; and
   memory coupled to the processor, the memory storing thereon computer-readable instructions that, when executed by the processor, cause the processor to perform operations comprising:
      receiving a first plurality of media components, the first plurality of media components comprising a first media component and a second media component,
      determining that a portion of the first media component and a portion of the second media component of the first plurality of media components conflict when the first media component and the second media component are combined,
      determining a first weighting parameter associated with the first media component and a second weighting parameter associated with the second media component based on first media parameters corresponding to a first user, the first weighting parameter less than the second weighting parameter, and
      modifying the first plurality of media components to create a first virtual media instance, wherein modifying the first plurality of media components comprises combining the first media component and the second media component and eliminating the portion of the first media component in favor of the portion of the second media component based on the first weighting parameter associated with the first media component being less than the second weighting parameter associated with the second media component.

9. The system of claim 8, wherein the memory stores thereon further computer-readable instructions that, when executed by the processor, cause the processor to perform operations comprising:

determining characteristics of the first virtual media instance;
updating the first media parameters corresponding to the first user with information corresponding to the characteristics of the first virtual media instance;
receiving a second plurality of media components; and
modifying the second plurality of media components based on the first media parameters updated to create a second virtual media instance.

10. The system of claim 9, wherein the first and second virtual media instances are for stimulating at least three of visual, auditory, tactile, olfactory, and gustatory user senses.

11. The system of claim 8, wherein the first weighting parameter associated with the first media component and the second weighting parameter associated with the second media component are based on how frequently a first parameter associated with the first media component is used when virtual media instances associated with the first user are created in comparison to how frequently a second parameter associated with the second media component is used when the virtual media instances associated with the first user are created.

12. The system of claim 8, wherein the memory stores thereon further computer-readable instructions that, when executed by the processor, cause the processor to perform operations comprising:
receiving from a remote user device a request for specifications corresponding to the first virtual media instance; and
providing the specifications to the remote user device, wherein the specifications are used by the remote user device to create the first virtual media instance.

13. The system of claim 8, wherein the memory stores thereon further computer-readable instructions that, when executed by the processor, cause the processor to perform operations comprising:
receiving from a remote user device a request for the first virtual media instance; and
providing the first virtual media instance to the remote user device, wherein second media parameters corresponding to a second user of the remote user device are updated based on the first virtual media instance, and wherein a second virtual media instance created by the remote user device is based on the second media parameters updated-based on the first virtual media instance.

14. The system of claim 8, wherein the memory stores thereon further computer-readable instructions that, when executed by the processor, cause the processor to perform operations comprising:
providing the first virtual media instance to the first user via a media output device;
receiving feedback associated with the first user regarding the first virtual media instance from a feedback device located in a proximity of the user, wherein the feedback comprises at least one of a blood pressure of the first user, a pulse of the first user, facial movements of the first user, muscle tension of the first user, brain activity of the first user, or location of the first user; and
updating the first media parameters corresponding to the first user based on the first virtual media instance and the feedback received.

15. A computer-readable storage medium for providing virtual media environments, comprising instructions that, when executed by a processor, cause the processor to perform operations comprising:

receiving a first plurality of media components, the first plurality of media components comprising a first media component and a second media component;
determining that a portion of the first media component and a portion of the second media component of the first plurality of media components conflict when the first media component and the second media component are combined;
determining a first weighting parameter associated with the first media component and a second weighting parameter associated with the second media component based on first media parameters corresponding to a first user, the first weighting parameter less than the second weighting parameter; and
modifying the first plurality of media components to create a first virtual media instance, wherein modifying the first plurality of media components comprises combining the first media component and the second media component and eliminating the portion of the first media component in favor of the portion of the second media component based on the first weighting parameter associated with the first media component being less than the second weighting parameter associated with the second media component.

16. The computer-readable storage medium of claim 15, comprising further instructions that, when executed by the processor, cause the processor to perform operations comprising:
determining characteristics of the first virtual media instance;
updating first media parameters corresponding to the first user with information corresponding to the characteristics of the first virtual media instance;
receiving a second plurality of media components; and
modifying the second plurality of media components based on the first media parameters updated to create a second virtual media instance.

17. The computer-readable storage medium of claim 16, wherein the first and second virtual media instances are for stimulating at least three of visual, auditory, tactile, olfactory, and gustatory user senses.

18. The computer-readable storage medium of claim 15, wherein the first weighting parameter associated with the first media component and the second weighting parameter associated with the second media component are based on how frequently a first parameter associated with the first media component is used when virtual media instances associated with the first user are created in comparison to how frequently a second parameter associated with the second media component is used when the virtual media instances associated with the first user are created.

19. The computer-readable storage medium of claim 15, comprising further instructions that, when executed by the processor, cause the processor to perform operations comprising:
receiving from a remote user device a request for specifications corresponding to the first virtual media instance; and
providing the specifications to the remote user device, wherein the specifications are used by the remote user device to create the first virtual media instance.

20. The computer-readable storage medium of claim 15, comprising further instructions that, when executed by the processor, cause the processor to perform operations comprising:
receiving from a remote user device a request for the first virtual media instance; and providing the first virtual media instance to the remote user device, wherein second media parameters corresponding to a second user of the remote user device are updated based on the first virtual media instance, and wherein a second virtual media instance created by the remote user device is based on the second media parameters updated based on the first virtual media instance.

\* \* \* \* \*